C. H. SMOOT.
PRESSURE OR VOLUME RECORDING METER.
APPLICATION FILED FEB. 24, 1919.
1,369,568. Patented Feb. 22, 1921.
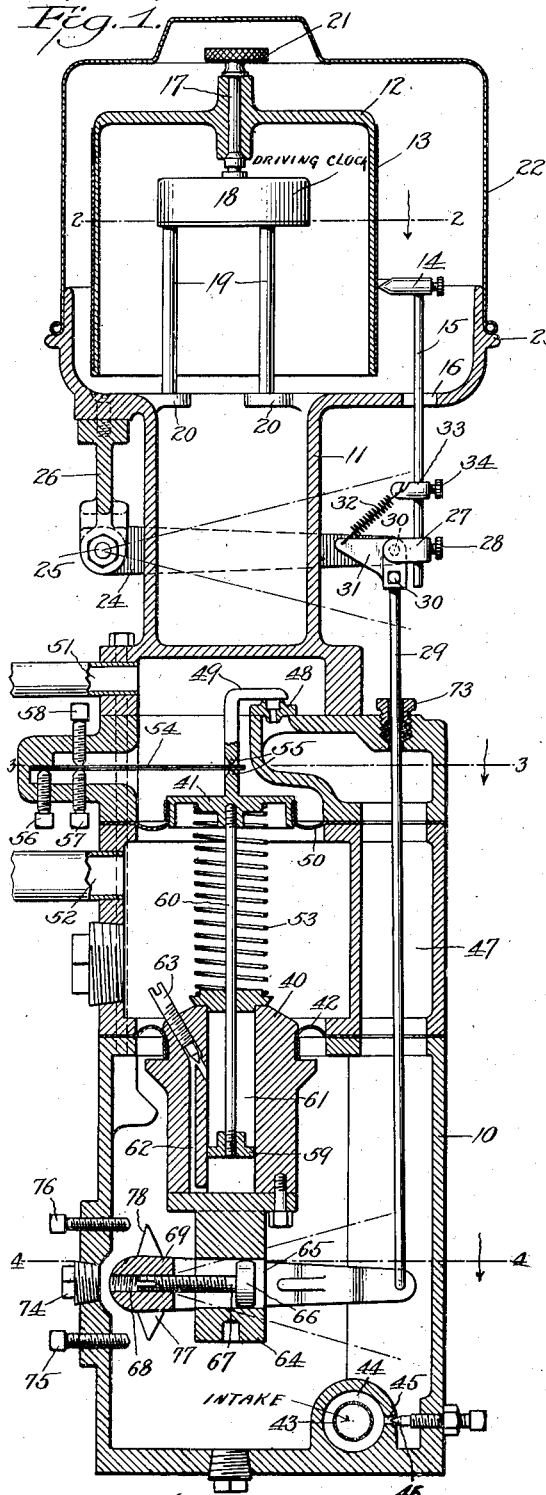
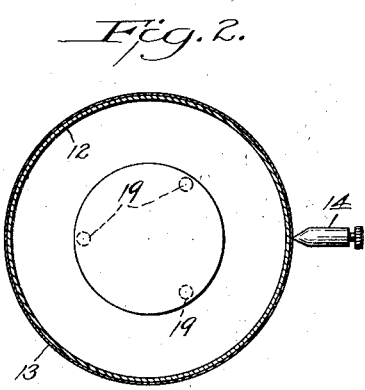
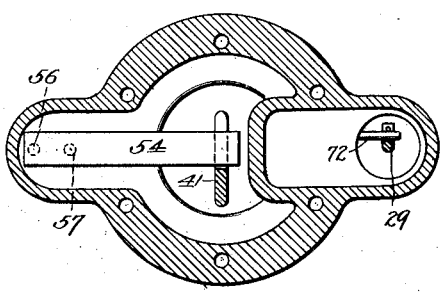
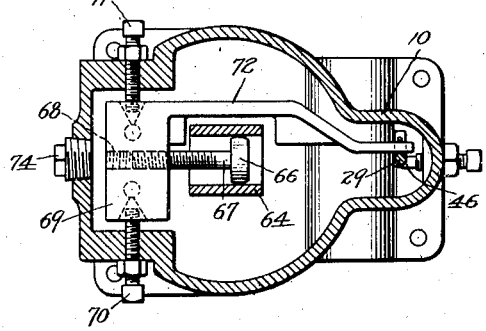
INVENTOR
Charles H. Smoot
BY
ATTORNEYS

UNITED STATES PATENT OFFICE.

CHARLES H. SMOOT, OF SOUTH ORANGE, NEW JERSEY, ASSIGNOR TO RATEAU BATTU SMOOT ENGINEERING CORPORATION, OF NEW YORK, N. Y., A CORPORATION OF DELAWARE.

PRESSURE OR VOLUME RECORDING METER.

1,369,568.　　　　　Specification of Letters Patent.　　Patented Feb. 22, 1921.

Application filed February 24, 1919. Serial No. 278,836.

*To all whom it may concern:*

Be it known that I, CHARLES H. SMOOT, a citizen of the United States, residing in South Orange, in the county of Essex and State of New Jersey, have invented certain new and useful Improvements in Pressure or Volume Recording Meters, of which the following is a specification.

My invention relates in general to apparatus for recording the pressure or volume of fluids. An important feature of the invention resides in a construction by which an accurate record is obtained even where the pressure variations are relatively small or where the volumes flowing are not subject to great changes. Another important feature is found in the adaptability of the construction to easy modification to obtain the record of pressure or volume in any desired scale. While the construction enables small changes in pressure or volume to be multiplied and transmitted to the recording member *per se* with increased force or on a larger scale, the invention provides for obtaining these results without sudden or abrupt oscillations of the recording mechanism where sudden changes occur. That is to say, a damping device is embodied in the construction so that changes which are merely momentary in the pressure or volume of the fluid are not accompanied by sudden response in the recording mechanism, but any change in the record is made more gradually so that "over-travel" is entirely avoided.

The invention involves certain principles of construction which may be embodied in various forms as will be readily understood from the description of the specific embodiment such as shown by way of example in the accompanying drawing.

In said drawings, Figure 1 represents a central vertical section of the complete unit, and Figs. 2, 3 and 4 are cross sections thereof on the lines 2—2 3—3 and 4—4 of Fig. 1 looking in the direction of the arrows.

Referring in detail to said drawing, 10 indicates the main housing of the control and actuating members whereas 11 indicates a casing superposed on the main housing 10 for the support of the recording apparatus of the meter. The recording unit comprises drum 12 on which is mounted the chart 13 exposed to the marking member 14 which is mounted on a vertical rod 15 passing through a perforation 16 of the casing 11. The drum 12 is secured on the shaft 17 of a clock work mechanism 18 which is mounted on frame 19 suitably disposed in the casing 11 as for example upon lugs 20 formed integral with the latter. The drum 12 is securely fixed on the shaft 17 by suitable means such as the knurled head 21. It may be assumed that the clock work mechanism 18 rotates the drum 12 uniformly at the rate of one complete turn in twenty four hours or in any other desired unit of time measurement. During such rotation the marking member 14, as will be explained hereinafter, rises or falls in response to changes in pressure or volume so that the course of such changes is transmitted to the record sheet 13 in the form of an elongated curved line, all of which is well known in the art. The record sheets 13 are ordinarily provided with suitable subdivisions showing the respective units of time and pressure or volume. The dust cover 22 which may be in part or in its entirety transparent to permit observation of the record if desired, is conveniently mounted on a flange 23 of the casing 11.

To assist in the proper guiding and support of the marking member 14, an arm 24 is pivoted at 25 in a depending bracket or frame piece 26, and to the free end of this arm 24 a yoke piece 27 may be pivoted, in which is secured the vertical stem or rod 15 by means of the set screw 28. An operating rod 29 is suitably secured in a yoke piece 30 which straddles the free end of arm 24 either within or outside of yoke piece 27, both of which members have pivotal connection at 30 with the arm 24. An extension 31 from yoke piece 30 forms a mounting for one end of a tension spring 32, the other end of which may be secured in a hook 33 fastened on the vertical rod or stem 15 by set screw 34. Obviously, the position of the hook member 33 can be adjusted up or down on stem 15 to place the spring 32 under the proper degree of tension so as to afford sufficient pressure of marking member 14 against the record sheet 13. When it is desired to remove or insert a record sheet in the apparatus, the marking member can be swung outward against the tension of its return spring 32 as will be apparent.

The apparatus thus far described, comprises the recording mechanism proper, and I shall now describe an embodiment of apparatus constructed in accordance with the principles of my invention by which the desired actuation of the recording mechanism is obtained. For this actuating mechanism or metering mechanism, which meters the change of pressure or volume, I prefer to employ a principle of construction and operation such as broadly set forth in my prior applications filed March 25th, 1918, Serial No. 224622 and December 10th, 1918, Serial No. 266037. In said prior applications, the apparatus involved is primarily employed to regulate the pressure or volume and for that purpose an actuating member in the form of a diaphragm is exposed to the pressure of an operating fluid which is admitted at a definite restricted rate into the chamber in which the said member is disposed, and is permitted to be discharged therefrom at a greater or lesser rate through a relief valve mechanism whose position is predicated upon the pressure or volume to be regulated. Thus, the pressure against the actuating member builds up when the regulated pressure is high, so as to obtain a closing of the regulating valve, and the pressure is lowered by increased relief when the regulated pressure drops.

The invention in the present case involves the provision of certain elements by which the regulating mechanism of said prior applications is converted into a metering and recording device for pressure or volume. That is to say, means are here provided by which the response of the actuating member to changes in the pressure or volume is graduated so as to obtain corresponding movement of the actuating member unit for unit with a given change of pressure or volume.

The metering and actuating device is here shown as inclosed within the housing 10 and may be regarded as made up of two essential parts namely, the actuating member 40 and the pressure or volume responsive member 41. Inasmuch as the member 41 responds directly only to pressure, although this pressure may be derived from a change in volume, as will be hereinafter explained, I shall for purpose of simplicity, refer to member 41 as the pressure responsive element. The actuating member 40 is in the form of a center block flexibly connected with its casing 10 by means of the yielding diaphragm 42. The space beneath block 40 and diaphragm 42 constitutes a chamber for receiving the operating fluid which is admitted through screen 43 into the space 44 from which it issues through an orifice 45 under the control of the adjustable restriction valve 46. The entrance of operating fluid into this chamber is continuous at a definite rate and its release therefrom occurs through the conduit 47 whose exit is by way of the valve opening on valve seat 48 under the control of an unbalanced relief valve 49. Relief valve 49 is carried by the pressure responsive element 41 which latter forms a center for the flexible diaphragm 50. To control the position of valve 49, the pressure responsive element 41 is exposed to pressure within the chamber immediately above it, which pressure may for example, be derived from or communicated by the pressure to be metered, through the passageway 51. Where pressures are to be metered and recorded, the space beneath the pressure responsive element 41 and above the actuating member 40 may be placed in communication with the atmosphere by the passage 52. The pressure of the operating fluid must of course always exceed the metered pressure on diaphragm 50, when the construction involves the discharge of operating fluid against the metered pressure.

It will be observed that the continued introduction of operating fluid into the chamber beneath the actuating member 40, at a definite rate of admission, will tend to increase the pressure striving to lift the actuating member 40 when the valve 49 is in a position which closes the relief valve opening beyond that point at which the escape of operating fluid equals the rate of admission. On the other hand, should the valve 49 be farther off its seat, so that the escape is more rapid than the admission of the operating fluid, the actuating member 40 is no longer subjected to an increasing pressure but on the contrary, this pressure grows less and permits operating member 40 to descend. Normal conditions of stability of all the operating parts are obtained when the release of operating fluid through valve 48 exactly equals the admission through valve 45. In my said prior applications, the motion of actuating member 40 effected the opening or closing of a regulating valve so that stability was automatically reached by restricting the regulated pressure to normal, at which point the escape of the operating fluid exactly equaled the admission, so that actuating member 40 became stationary. This will be apparent when it is borne in mind that the regulated pressure was in that case communicated to the pressure responsive member 41. In order to adapt the construction to operation as a meter, it is necessary to replace the regulating valve of the main conduit, where pressure is to be regulated, by some force tending to cumulatively oppose movement of the actuating member 40 until such force becomes equal to that to which it is opposed.

This condition or requirement is in the present instance fulfilled by the compression spring 53. Where pressure tends to build up under the diaphragm 42, the actuating member 40 rises and transmits through spring 53 a constantly increasing pressure opposed to the downward pressure applied to member 41 by the pressure to be metered. When these two forces become equal, stability is reached and the position of actuating member 40 represents or corresponds with a certain definite pressure in the fluid whose pressure is to be recorded. In this assumption the weights of the moving parts are neglected, as these are constant and correction for them may be made. The construction here shown provides for this purpose a leaf spring 54, passing through knife-edge portions 55 of the relief valve stem, which leaf spring may exert a slight raising or lowering influence upon the valve 49 under adjustment of its positioning and tensioning bolts 56, 57 and 58, as clearly shown in Fig. 1.

To prevent rapid operation or too sudden changes in position of the actuating member 40 or relief valve 49, a yielding interconnection between the parts 40 and 41 is provided, in the form of a dashpot piston 59 mounted on a rod 60 depending from pressure responsive element 41, which piston 59 operates in a chamber 61 formed in the body of block 40. The spaces above and below the piston 59 are in communication through the bypass 62, the resistance of which may be regulated by the needle valve 63. This resilient interconnection is in general similar to that set forth and described in my application of December 10th, 1918, Serial No. 266,037, wherein the operation is clearly set forth as involving the provision of a retarding force on the response of the actuating member 40 to any change in position of the pressure responsive member 41. This will be clear when it is considered that sudden raising of relief valve 49 would effect sudden fall of pressure under diaphragm 42 and by means of the dashpot device here described, this sudden response is yieldingly retarded. At the same time, the important effect is obtained, that the greater the value of the sudden change in pressure, the greater will be the force opposing response of actuating member 40 to the change in position of valve 49.

Actuating member 40 is provided below with an extension 64 which is recessed at 65 to receive a headpiece 66 of a screw 67 which latter is threaded adjustably into the tapped portion 68 of a lever 69 which is fulcrumed on the bolts 70, 71 (see Fig. 4). This lever 69 is offset at 72 and passes around the extension 64 of actuating member 40 and extends over to the lower portion of rod 29 and is suitably coupled therewith to actuate the same. Rod 29 passes through a stuffing box 73 in the upper wall of the chamber 47 so as to permit up and down movement of the rod while not permitting escape of the operating fluid directly into the atmosphere. Up and down motion of actuating member 40 transmits a rocking motion to lever 69 through the lever arm constituted by the screw 67 and head 66, thereby obtaining a corresponding up and down movement of the rod 29 and the marking member 14. By adjusting the position of head 66 toward or away from the fulcrum points 70 and 71, the radius of oscillation of the arm constituted by the head 66 and screw 67 is varied so that the desired extent of movement of marking member 14 is obtained for a given movement of actuating member 40. This adjustment is accomplished by removing the threaded plug 74 and turning the threaded screw 67 in its seat by means of a screw driver or other suitable implement for which the construction of screw 67 provides. Bolts 75, 76 are adjustably positioned in the wall of housing 10 so as to constitute stops for the projecting arms or lugs 77, 78 formed on lever 69, to thereby limit the extreme movement of the lever.

From the above description, the operation of the invention will be clearly understood. Operating fluid entering the chamber beneath diaphragm 42 at a definite restricted rate, escapes through the relief valve 48, 49. The rate of such escape or relief is determined by the pressure to be metered and recorded, which is transmitted into the space above the pressure responsive member 41 by way of the conduit 51. The large area of diaphragm 50 and member 41 with respect to the area of valve 49 exposed to the operating fluid seeking escape from chamber 47, provides for a corresponding multiplication of effect over the value of the departure of the metered pressure from normal. Assuming first that the parts are in equilibrium throughout, an increase in pressure transmitted to the chamber above the pressure responsive element 41 correspondingly lowers the relief valve 49 and pressure immediately builds up beneath the diaphragm 42 which is connected with the recorder actuating member 40. The latter rises in response to this change in pressure until it compresses spring 53 sufficiently to transmit upwardly against the member 41 a pressure which just balances that of the fluid whose pressure is to be metered. The parts must then come to rest, as beyond that point, the valve 49 would be raised from its seat through the pressure transmitted by spring 53 and this would immediately arrest further rise of actuating member 40, by relieving the pressure below the latter. During this motion of actuating member 40, it is clear that marking member 14 has moved upward, leaving its record curve which is an indication of the change in pressure which was to be metered and recorded. Assume now a drop in pressure in the fluid whose pressure is to be metered. This drop in pressure is transmitted through conduit 51 into the chamber above the member 41, so that valve 49 is permitted to further leave its seat until the increased relief or escape of operating pressure from chamber 47 and from below the actuating member 40 and diaphragm 42 permits the latter to fall until equilibrium of relief valve 49 is obtained.

This fall of actuating member 40 is accompanied by movement of marking member 14 to leave a corresponding record of the change in pressure which has occurred. The scale in which these records are made will obviously vary according to the length of the lever arm constituted by head 66 and screw 67. The non-uniformity of compression springs as ordinarily procurable upon the market may be corrected by suitable adjustment of the length of this lever arm just referred to, as a stiffer spring tending to require greater change in position for a given change of pressure can readily be taken care of by shortening the lever arm and in a reverse way the springs which are inferior in stiffness to the assumed normal may be compensated. Leaf spring 54 may be adjusted to bring the marking member 14 into proper normal position.

With reference to the metering and recording of changes in volume, those skilled in this art will be well aware that pipes 51 and 52 may communicate with a conduit at two sides of an orifice through which the volumes are flowing in the manner shown for instance in the German Patent No. 173,658 of May 31st, 1904, so as to derive relative pressures which are communicated to the spaces above and below the pressure responsive member 41. The pressure tending to raise member 41 in this way also tends to lower the member 40 so that the position in which member 40 comes to rest will represent correctly a definite volumetric flow which is to be recorded.

I claim:—

1. A fluid pressure meter comprising in combination an indicating member, a pressure responsive actuating member therefor, means for continuously admitting a restricted supply of operating fluid to said actuating member, means controlled by the metered pressure for variably releasing the operating fluid from said actuating member, and means for applying to said releasing means a cumulative force opposed to the metered pressure and directly proportional to the travel of said actuating member, to correlate such travel with change of metered pressure.

2. A fluid pressure meter comprising in combination an indicating member, a pressure responsive actuating member therefor, means for continuously admitting a restricted supply of operating fluid to said actuating member, means controlled by the metered pressure for variably releasing the operating fluid therefrom, a yielding interconnection between said actuating member and said releasing means for retarding movement of one in response to a change in position of the other, and means for applying to said releasing means a cumulative force opposed to the metered pressure and directly proportional to the travel of said actuating member, to correlate such travel with change of metered pressure.

3. A fluid pressure meter comprising in combination an indicating member, a pressure responsive actuating member therefor, an adjustable operating connection between said indicating member and its actuating member, means for continuously admitting a restricted supply of operating fluid to said actuating member, means controlled by the metered pressure for variably releasing the operating fluid therefrom, and means for applying to said releasing means a cumulative force opposed to the metered pressure and directly proportional to the travel of said actuating member, to correlate such travel with change of metered pressure.

4. A fluid pressure meter comprising in combination an indicating member, a pressure responsive actuating member therefor, means for continuously admitting a restricted supply of operating fluid to said actuating member, means controlled by the metered pressure for variably releasing the operating fluid therefrom, means for adjusting the normal position of said releasing means, and means for applying to said releasing means a cumulative force opposed to the metered pressure and directly proportional to the travel of said actuating member, to correlate such travel with change of metered pressure.

5. A fluid pressure meter comprising in combination an indicating member, an actuating mechanism, and a control mechanism, and means for continuously admitting operating fluid at a restricted rate of supply, said actuating mechanism having a pressure responsive diaphragm member operatively connected with the indicating member and exposed to said operating fluid, and said control mechanism having a valve for variably releasing the operating fluid from the actuating mechanism to govern the pressure thereon, and said control mechanism being further provided with a pressure operated diaphragm member exposed to the metered pressure for governing the position of the release valve, the two said diaphragm members having between them a spring by which the travel of the actuating mechanism applies to the release valve control mechanism a force in opposition to the metered pressure and proportional to the travel of the actuating mechanism.

6. A fluid pressure meter comprising in combination a pair of pressure actuated diaphragm members arranged one above the other, a compression spring between them, a restricted inlet for operating fluid leading into the space beneath the lower diaphragm member, an outlet for the release of operating fluid from such space, a valve controlled by the upper diaphragm member for automatically varying the effective area of said outlet, and means for admitting the pressure to be metered into the space above said upper diaphragm.

CHARLES H. SMOOT.